(12) United States Patent
Su et al.

(10) Patent No.: US 11,508,157 B2
(45) Date of Patent: Nov. 22, 2022

(54) DEVICE AND METHOD OF OBJECTIVE IDENTIFICATION AND DRIVING ASSISTANCE DEVICE

(71) Applicant: BOE TECHNOLOGY GROUP CO., LTD., Beijing (CN)

(72) Inventors: Haijun Su, Beijing (CN); Xiaojun Tang, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 1004 days.

(21) Appl. No.: 16/066,799

(22) PCT Filed: Oct. 24, 2017

(86) PCT No.: PCT/CN2017/107434
§ 371 (c)(1),
(2) Date: Jun. 28, 2018

(87) PCT Pub. No.: WO2018/188309
PCT Pub. Date: Oct. 18, 2018

(65) Prior Publication Data
US 2021/0166042 A1    Jun. 3, 2021

(30) Foreign Application Priority Data
Apr. 10, 2017  (CN) .......................... 201710229280.7

(51) Int. Cl.
*G06K 9/00* (2022.01)
*G06N 20/20* (2019.01)
(Continued)

(52) U.S. Cl.
CPC ............. *G06V 20/58* (2022.01); *B60W 30/08* (2013.01); *G05B 13/0265* (2013.01);
(Continued)

(58) Field of Classification Search
CPC .. G06K 9/00805; G06K 9/00369; G06K 9/46; G06K 9/6256; G06K 9/6277;
(Continued)

(56) References Cited

U.S. PATENT DOCUMENTS 8,301,406 B2 * 10/2012 Lee ..................... G06K 9/00496
702/77
8,768,868 B1  7/2014 Cheng et al.
(Continued)

FOREIGN PATENT DOCUMENTS

CN    103927531 A    7/2014
CN    106485283 A    3/2017

OTHER PUBLICATIONS

Supplementary European Search Report dated Jan. 14, 2021 issued in corresponding European Application No. 17882265.6.
(Continued)

*Primary Examiner* — Pinalben Patel
(74) *Attorney, Agent, or Firm* — Nath, Goldberg & Meyer; Joshua B. Goldberg

(57) ABSTRACT

The disclosure provides an objective identification device, comprising: a classifier training circuit configured to extract objective characteristics based on training samples and perform offline training based on the objective characteristics to obtain a classifier; and a calculation circuit is configured to identify an objective in an image based on a particle swarm optimization algorithm, wherein each of particles is defined as an object having a predefined size in the image; and a fitness value of each of particles is calculated based on the classifier and the objective characteristics of the particle in the particle swarm optimization algorithm, the fitness value representing a probability that the particle belongs to the objective. The disclosure also provides an objective identification method and driving assistance device. According to the disclosure, not only the (Continued)

identification rate can be increased but also application scenarios having different identification rate requirements can be satisfied.

17 Claims, 3 Drawing Sheets

(51) Int. Cl.
  *B60W 30/08* (2012.01)
  *G05B 13/02* (2006.01)
  *G06K 9/46* (2006.01)
  *G06K 9/62* (2022.01)
  *G06T 3/40* (2006.01)
  *G06V 20/58* (2022.01)
  *G06V 10/40* (2022.01)
  *G06V 40/10* (2022.01)

(52) U.S. Cl.
  CPC ......... *G06K 9/6256* (2013.01); *G06K 9/6277* (2013.01); *G06N 20/20* (2019.01); *G06T 3/40* (2013.01); *G06V 10/40* (2022.01); *G06V 40/103* (2022.01)

(58) Field of Classification Search
  CPC ... G06N 20/20; B60W 30/08; G05B 13/0265; G06T 3/40
  See application file for complete search history.

(56) References Cited

U.S. PATENT DOCUMENTS

| | | | |
|---|---|---|---|
| 2007/0263900 A1* | 11/2007 | Medasani | G06K 9/00369 382/103 |
| 2010/0195908 A1 | 8/2010 | Bechtel et al. | |
| 2015/0186714 A1* | 7/2015 | Ren | H04N 7/183 348/77 |
| 2020/0184131 A1* | 6/2020 | Zhang | G06F 30/27 |
| 2022/0153236 A1* | 5/2022 | Liu | G01N 17/006 |

OTHER PUBLICATIONS

Fan, et al., "An Approach Based on Particle Swarm Optimization for Fast Object Detection", Fourth International Workshop on Advanced Computational Intelligence, pp. 120-124, Oct. 2011.

Wei-Xing, et al., "A Pedestrian Detection Method based on PSO and Multimodal Function", 28th Chinese Control and Decision Conference (CCDC), pp. 6054-6058, May 2016.

Blondel, et al., "Dynamic collaboration of far-infrared and visible spectrum for human detection", 23rd Internaitonal Conference on Pattern Recognition (ICPR), pp. 698-703, Dec. 2016.

Dollar, et al., "Integral Channel Features", Proceedings of the British Machine Vision Conference, pp. 91.1-91.11, Jan. 2009.

First Office Action dated Apr. 7, 2020 for corresponding Chinese application 201710229280.7.

Zhou, H. et al., "Pedestrian detection model based on multi-features and least squares support vector machine", Lasernal, China Academic Journal Electronic Publishing House, vol. 35, No. 10, 2014, pp. 46-56.

Youcai, Wang; "Research on Vehicle Front Mounted Pedestrian Detection Algorithm"; A Thesis in Vehicle Engineering, Northeastern University; Jun. 2013; with English Abstract attached.

International search report dated Jan. 29, 2018 for corresponding application No. PCT/CN2017/107434 with English translation attached.

\* cited by examiner

DEVICE AND METHOD OF OBJECTIVE IDENTIFICATION AND DRIVING ASSISTANCE DEVICE

CROSS-REFERENCE TO RELATED APPLICATION

This application is entering the national phase of PCT Application No. PCT/CN2017/107434, filed on Oct. 24, 2017, titled "DEVICE AND METHOD OF OBJECTIVE IDENTIFICATION AND DRIVING ASSISTANCE DEVICE", an application claiming the benefit of Chinese Application no. 201710229280.7, filed Apr. 10, 2017 in the Chinese Intellectual Property Office, the disclosure of which is incorporated herein by reference.

FIELD

The disclosure relates to the field of objective identification technologies, and in particular to a device and method of objective identification and a driving assistance device.

BACKGROUND

Objective identification is a key technology of driving assistance device or intelligent monitoring device, which is mainly used to identify in real time the presence of objectives in a target area by image processing technologies to provide technical basis for a real-time warning. At present, commonly used objective identification devices can be employed by cameras and computer vision technologies. The hardware devices for implementing the objective identification devices are simple and low-cost, but the software algorithm for implementing the objective identification devices is relatively complicated. Improvements on identification accuracy and identification rate have become the focus of attention in this field.

For the driving assistance device, if multiple persons appear in the screen, it can be tolerable to identify one of persons in an actual application system. Therefore, the identification rate is more important than the identification accuracy. However, commonly used objective identification devices in the state of the art employ a sliding window to traverse and search an image, which have a low identification rate and cannot meet the requirements.

SUMMARY

The disclosure is intended to provide an objective identification device and method and a driving assistance device to address at least one of technical problems in the prior art. According to the disclosure, not only the identification rate can be increased but also application scenarios having different identification rate requirements can be satisfied.

In order to address one of above problems, an embodiment of the disclosure provides an objective identification device, comprising a classifier training circuit and a calculation circuit, wherein the classifier training circuit is configured to extract objective characteristics based on training samples and perform offline training based on the objective characteristics to obtain a classifier; and the calculation circuit is configured to identify an objective in an image based on a particle swarm optimization algorithm, wherein each of particles is defined as an object having a predefined size in the image; and a fitness value of each of particles is calculated based on the classifier and the objective characteristics of the particle in the particle swarm optimization algorithm, the fitness value representing a probability that the particle belongs to the objective.

Optionally, the objective identification device further comprises an image capture circuit and a sampling circuit, wherein the image capture circuit is configured to capture the image to be identified; and the sampling circuit is configured to sample the image to be identified to obtain a sub-image.

Optionally, the calculation circuit is configured to identify the objective in the sub-image based on particle swarm optimization algorithm, wherein each of particles is defined as the object having the predefined size in the sub-image; and the fitness value of each of particles is calculated based on the classifier and the objective characteristics of the particle in the particle swarm optimization algorithm, the fitness value representing the probability that the particle belongs to the objective.

Optionally, the objective characteristics comprise an integral channel feature.

Optionally, the classifier comprises a boost classifier.

Optionally, the calculation circuit comprises: an initialization sub-circuit, configured to initialize a maximum number of iterations, a number of particles, a position of each of particles, parameters in a velocity update formula, and parameters in a position update formula; an objective characteristic extraction sub-circuit, configured to extract the objective characteristics of each of particles; a fitness value calculation sub-circuit, configured to calculate the fitness value of each of particles based on the classifier and the objective characteristics of the particle; an optimal position determination sub-circuit, configured to compare the fitness value of each of particles with a fitness value of the particle at the previous search position to determine a maximum one of the fitness values as a local optimal solution of the particle during the search process and determine a maximum fitness value among the local optimal solutions of all the particles as a global optimal solution; a particle velocity update sub-circuit, configured to update the velocity of each of particles based on the global optimal solution and the local optimal solution; a particle position update sub-circuit, configured to update a position of each of particles based on the updated particle velocity to obtain a next-generation particle; a result output sub-circuit, configured to judge whether the fitness value of each of next-generation particles calculated by the fitness value calculation sub-circuit reaches a preset value, wherein if yes, the objective identification device determines that the particle belongs to the objective, or if not, the objective identification device controls the optimal position determination sub-circuit to keep in operation; and an iteration count sub-circuit, configured to add a current number of iterations by 1 after the next-generation particle is obtained, and send a lay-off instruction to the objective characteristic extraction sub-circuit when the number of iterations reaches the maximum number of iterations.

Optionally, the sampling circuit is configured to perform step-by-step scaling of the image to be identified in accordance with a preset scaling factor to obtain a multi-level sub-image; and the calculation circuit is configured to identify the objective on a next level of sub-image based on the particle swarm optimization algorithm when the number of iterations reaches the maximum number of iterations.

An embodiment of the disclosure also provides an objective identification method, comprising steps of: extracting objective characteristics based on training samples, and performing offline training based on the objective characteristics to obtain a classifier; capturing an image to be identified; sampling the image to be identified to obtain a sub-image; and identifying an objective in the sub-image based on a particle swarm optimization algorithm, wherein each of particles is defined as an object having a predefined size in the sub-image, and a fitness value of each of particles is calculated based on the classifier and the objective characteristics of the particle in the particle swarm optimization algorithm, the fitness value indicating a probability that the particle belongs to the objective.

Optionally, the objective characteristics comprise an integral channel feature.

Optionally, the classifier comprises a boost classifier.

Optionally, the step of identifying an objective in the sub-image based on a particle swarm optimization algorithm comprises: an initialization step comprising: initializing a maximum number of iterations, a number of particles, a position of each of particles, parameters in a velocity update formula, and parameters in a position update formula; and an operation step, comprising: extracting the objective characteristics of each of particles; calculating the fitness value of each of particles based on the classifier and the objective characteristics of the particle; comparing the fitness value of each of particles with a fitness value of the particle at the previous search position to determine the maximum one as a local optimal solution of the particle during the search process and determine a maximum fitness value among the local optimal solutions of all the particles as a global optimal solution; updating a velocity of each of particles based on the global optimal solution and the local optimal solution; updating a position of each of particles based on the updated particle velocity to obtain a next-generation particle; extracting the objective characteristics of each of next-generation particles, calculating a fitness value of each of next-generation particles based on the classifier and the objective characteristics of the next-generation particle, and judging whether the fitness value reaches a preset value, wherein if yes, it is determined that the particle belongs to the objective, or if not, the method returns to the operation step; and adding a current number of iterations by 1 after the next-generation particle is obtained and laying off the work operation when the number of iterations reaches the maximum number of iterations.

Optionally, the step of sampling the image to be identified to obtain a sub-image comprises: performing step-by-step scaling of the image to be identified according to a preset scaling factor to obtain a plurality of sub-images; and in a condition that the number of iterations reaches the maximum number of iterations, the method further comprises: identifying the objective based on the particle swarm optimization algorithm for a next-level sub-image.

An embodiment of the disclosure also provides a driving assistance device, comprising the objective identification device as set forth.

An embodiment of the disclosure also provides an electronic apparatus, comprising a housing, a processor, a memory, a circuit board, and a power circuit, wherein the circuit board is mounted inside a space enclosed by the housing, and the processor and the memory are disposed on the circuit board; the power circuit is configured to supply power to various circuits or devices of the electronic apparatus; and the memory is configured to store executable program codes, wherein the processor reads the executable program codes stored in the memory and runs a program corresponding to the executable program codes to execute steps of: extracting objective characteristics based on training samples, and performing offline training based on the objective characteristics to obtain a classifier; capturing an image to be identified; sampling the image to be identified to obtain a sub-image; and identifying an objective in the sub-image based on a particle swarm optimization algorithm, wherein each of particles is defined as an object having a predefined size in the sub-image, and a fitness value of each of particles is calculated based on the classifier and the objective characteristics of the particle in the particle swarm optimization algorithm, the fitness value indicating a probability that the particle belongs to the objective.

DETAILED DESCRIPTION OF THE EMBODIMENTS

In order to better understand the technical solutions of the present disclosure by those skilled in the art, the device and method of objective identification and a driving assistance device according to the present disclosure will be described in detail hereinafter in conjunction with the accompanying drawings.

It should be noted that the term "objective" used herein can refer to any pedestrian, animal or other obstacle, such as a roadside, a utility pole, other parked vehicle, etc.

Figure 1:
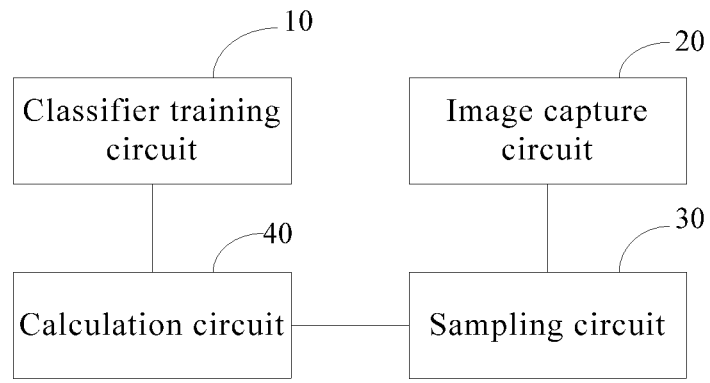
FIG. 1 is a block diagram illustrating the principle of an objective identification device according to an embodiment of the present disclosure.

FIG. 1 is a block diagram illustrating the principle of an objective identification device according to an embodiment of the present disclosure. Referring to FIG. 1, the objective identification device according to the embodiment of the present disclosure includes a classifier training circuit 10, an image capture circuit 20, a sampling circuit 30, and a calculation circuit 40.

Herein, the classifier training circuit 10 is configured to extract objective characteristics based on training samples and perform offline training based on the objective characteristics to obtain a classifier. The image capture circuit 20 is configured to capture an image to be identified. The sampling circuit 30 is configured to sample the image to be identified to obtain a sub-image. The calculation circuit 40 is configured to identify an objective in the sub-image based on particle swarm optimization algorithm, wherein each of particles is defined as an object having a predefined size in the sub-image and includes the objective characteristics to a certain degree; and a fitness value of each of particles is calculated based on the classifier and the objective characteristics of the particle in the particle swarm optimization algorithm, the fitness value representing a probability that the particle belongs to an objective. Specifically, if the fitness value is larger, it means that the possibility that the particle belongs to an objective is higher; or if the fitness value is smaller, the possibility that the particle belongs to an objective is lower.

Herein, the image capture circuit 20 may be formed as a camera or the like having an imaging function, and the calculation circuit 40 may be formed as a processor or the like.

Preferably, the objective characteristics include but are not limited to an integral channel feature. Since the integral channel feature can better describe the objectives, the objective identification accuracy and efficiency can be improved.

Specifically, according to a definition of the integral channel feature, the objective identification device according to the embodiment of the present disclosure may calculate and connect in sequence the characteristics including LUV (chroma and color difference), gradient magnitude and Histogram of Gradient (HOG) to form the integral channel feature, where LUV represents brightness and two color difference features; gradient magnitude is a square root of pixel differences of the upper, lower, left and right neighbouring pixels, and the HOG is an arc tangent of pixel differences of the upper, lower, left and right neighbouring pixels (Equation (1)), mag denotes a gradient magnitude and Ori denotes a gradient direction; HOG is a weighted histogram representation of the gradient magnitude of each pixel in a corresponding gradient direction (Equation (2)).

$$mag = \sqrt{(f_{x+1,y} - f_{x-1,y})^2 + (f_{x,y+1} - f_{x,y-1})^2} \quad (1)$$

$$Ori = \arctan \frac{f_{x,y+1} - f_{x,y-1}}{f_{x+1,y} - f_{x-1,y}}$$

$$h\left(\left\lceil \frac{Ori}{30} \right\rceil\right) = h\left(\left\lceil \frac{Ori}{30} \right\rceil\right) + mag \quad (2)$$

Herein, $f_{i,j}$ in Equation (1) and (2) represents a pixel value at image position (i, j); and $$h\left(\left\lceil \frac{Ori}{30} \right\rceil\right)$$

in Equation (2) represents the $$\left\lceil \frac{Ori}{30} \right\rceil$$

th histogram.

Preferably, the classifier includes but is not limited to a boost classifier. The boost classifier is a process that enhances a series of weak classifiers into one strong classifier. Therefore, the boost classifier has the characteristics of flexible use and high classification accuracy, while taking into account the computing performance.

Figure 2:
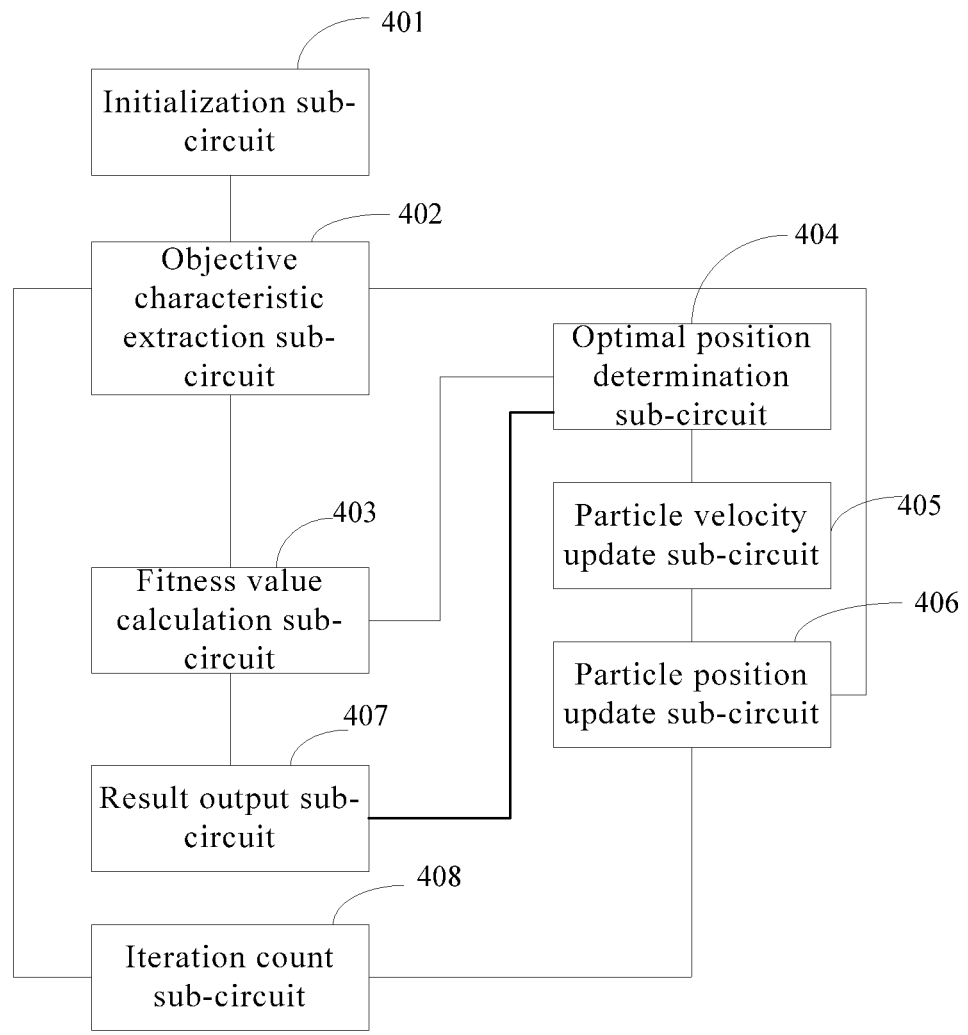
FIG. 2 is a block diagram illustrating the principle of a calculation circuit in FIG. 1.

Specifically, referring to FIG. 2, the calculation circuit 40 includes: an initialization sub-circuit 401, an objective characteristic extraction sub-circuit 402, a fitness value calculation sub-circuit 403, an optimal position determination sub-circuit 404, a particle velocity update sub-circuit 405, a particle position update sub-circuit 406, a result output sub-circuit 407 and an iteration count sub-circuit 408.

Herein, the initialization module 401 is configured to initialize a maximum number of iterations, a number of particles, a position of each of particles, parameters in a velocity update formula, and parameters in a position update formula.

It should be noted here that the maximum number of iterations and the number of particles are usually set by a user; the position of each initialized particle is usually set to a random value; the parameters in the velocity update formula and the position update formula may be optimal constants obtained based on experience. For objective identification, the two-dimensional space is used as a search space. Therefore, the position of the particles can be represented by $(x_{i1}, x_{i2})$. Each particle has not only a position attribute but also a velocity attribute and a fitness value attribute.

The objective characteristic extraction sub-circuit 402 is configured to extract the objective characteristics of each of particles.

The fitness value calculation sub-circuit 403 is configured to calculate the fitness value of each of particles based on the classifier and the objective characteristics of the particle. Specifically, the fitness value is used to measure the pros and cons of particles, and also serves as the basis for determining a local and global optimal particle and the foundation for particle search.

The optimal position determination sub-circuit 404 is configured to compare the fitness value of each of particles with a fitness value of the particle at the previous search position to determine a maximum one of the fitness values as a local optimal solution of the particle during the search process and determine a maximum fitness value among the local optimal solutions of all the particles as a global optimal solution.

The particle velocity update sub-circuit 405 is configured to update the velocity of each of particles based on the global optimal solution and the local optimal solution. Specifically, since the motion of particles is affected by the local optimal solution and the global optimal solution, the velocity update formula includes but is not limited to the follows:

$$v_{id}^{k+1} = \omega v_{id}^k + c_1 \xi (p_{id}^k - x_{id}^k) + c_2 \eta (p_{gd}^k - x_{id}^k)$$

Herein, ω is a coefficient of maintaining an original velocity, called an inertia weight and usually set to 0.79;

$c_1$ is a weight coefficient that a particle keeps a track of its own historical optimal value, representing the particle's own cognition, called a cognitive coefficient and usually set to 2;

$c_2$ is a weight coefficient that a particle keeps a track of an optimal value in a particle swarm, representing a particle's cognition of the whole swarm's knowledge, called a social coefficient and usually set to 2;

ξ, η are random numbers uniformly distributed in an interval [0, 1], serving to generate a random disturbance, and usually set to 0.7; d represents a dimension where only two dimensions x and y are for objective recognition;

$p_{id}^k$ represents a local optimal solution of the i-th particle in d-dimension in the k-th iteration;

$p_{gd}^k$ represents a global optimal solution of all particle in d-dimension of in the k-th iteration; and $x_{id}^k$ represents a position of the i-th particle in d-dimension in the k-th iteration.

The physical meaning of the velocity update formula is: the velocity of the i-th particle in d-dimension in (k+1)-th iteration=the product of the velocity of the particle in k-th iteration and the inertial coefficient+the amount of attraction of the particle in d-dimension subjected to the local optimal solution+the amount of attraction of the particle in d-dimension subjected to the global optimal solution. Usually, in order to prevent the excessive calculation, a maximum velocity and a minimum velocity are set.

The particle position updating sub-circuit 406 is configured to update a position of each of particles based on the updated particle velocity to obtain a next-generation particle. Specifically, since each particle has a velocity calculated above, the position of the particle may be updated by the following formula based on the velocity:

$$x_{id}^{k+1} = x_{id}^k + r v_{id}^{k+1}$$

Herein r is s velocity constraint and is usually set to 1.

The physical meaning of the position update formula is: the position of the i-th particle in d-dimension in the (k+1)-th iteration search=the previous position in d-dimension+the product of the velocity and the constraint amount.

It is to be explained here that during the particle update process, the particles need to be kept within a search space. For a sub-image having a size of [m,n] the particle size is 64*128. Therefore, the search space is [m−64,n−128].

The result output sub-circuit 407 is configured to judge whether the fitness value of each of next-generation particles calculated by the fitness value calculation sub-circuit 403 reaches a preset value, wherein if yes, the objective identification device determines that the particle belongs to the objective, or if not, the objective identification device controls the optimal position determination sub-circuit 404 to keep in operation. It can be understood that the identification rate can be further increased by using the preset value as a threshold to judge whether the particle belongs to an objective.

In practical applications, specifically, if the result output sub-circuit determines that the particle belongs to an objective, an image corresponding to the particle is superimposed in the output image, and/or an alarm is provided.

The iteration count sub-circuit 408 is configured to add a current number of iterations by 1 after the next-generation particle is obtained, and send a lay-off instruction to the objective characteristic extraction sub-circuit 402 when the number of iterations reaches the maximum number of iterations.

More specifically, the sampling circuit 30 is configured to perform step-by-step scaling of the image to be identified in accordance with a preset scaling factor to obtain a multi-level sub-image; and the calculation circuit 40 is configured to identify the objective on a next level of sub-image based on the particle swarm optimization algorithm when the number of iterations reaches the maximum number of iterations. Through the sampling circuit 30, the image to be identified is scaled step by step in accordance with the preset scaling factor to obtain the multi-level sub-images. As such, the objective can be identified in an enlarged sub-image when the objective is small in the sub-image, while the objective can be identified in a reduced sub-image when the objective is large in the sub-image. Therefore, the objective identification device according to the embodiment of the present disclosure can quickly identify an objective.

More specifically, assuming an image size of [m,n], the sampling formula can be expressed as: scale*[m,n], where scale is a scaling factor. If the scaling factor is greater than 1, a width and height of a sub-image at each level of the sample will be scaled up according to the proportion relative to the sub-image at previous level. At this point, the sub-image can be called to be up-sampled. If 0<scale<1, a width and height of each sub-image at each level of the sample will be scaled down according to the proportion relative to the previous sub-image. At this point, the sub-image can be called to be down-sampled. Here, the obtained multi-level sub-images may be sequentially referred to as a first-level sub-image, a second-level sub-image, and so on, where the first-level sub-image is a previous level sub-image relative to the second-level sub image.

The operation process of the objective identification device according to the embodiment of the present disclosure will be described in detail hereinafter. Specifically, the operation process includes steps of:

S1, initializing, by the initialization sub-circuit 401, a maximum number of iterations, a number of particles, a position of each of particles, parameters in a velocity update formula, and parameters in a position update formula;

S2, selecting a frame as an image to be identified in a video; and

S3, performing, by the sampling circuit 30, step-by-step scaling according to a preset scaling factor on the image to be identified to obtain a multi-level sub-image.

When the first level of sub-image is selected, the operation process also performs steps of:

S4, extracting, by the objective characteristic extraction sub-circuit 402, objective characteristics of each particle;

S5, calculating, by the fitness value calculation sub-circuit 403, a fitness value of each particle based on a classifier and objective characteristics of the particle;

S6, determining, by the optimal position determination sub-circuit 404, a local optimal solution and a global optimal solution;

S7, updating, by the particle velocity updating sub-circuit 405, a velocity of each particle based on the local optimal solution and the global optimal solution;

S8, updating, by the particle position updating sub-circuit 406, a position of each particle based on the updated velocity of the particle to obtain a next-generation particle;

S9, extracting, by the objective characteristic extraction sub-circuit 402, the objective characteristics of the next-generation particles;

S10, calculating, by the fitness value calculation sub-circuit 403, the fitness value of the particle based on the classifier and the objective characteristics of each next-generation particle;

S11, judging, by the result output sub-circuit 407, whether the fitness value of each next-generation particle reaches a preset value, wherein if yes, the objective identification device determines that the particle belongs to an objective, superimposes the image corresponding to the particle in an output image, and/or provide an alarm; if not, the objective identification device executes step S12 and then returns to step S6; and S12, adding, by the iteration count sub-circuit 408, the current number of iterations by 1 after the next-generation particle is obtained, and executes step S4 on a next level of sub-image when the number of iterations reaches a maximum number of iterations.

If no objective is identified at steps S10 and S11 for the multi-level sub-images, the process will go to step S2 where a next frame of the video is used as an image to be identified, and the process keeps in operation.

In summary, the objective identification device according to the embodiment of the present disclosure applies the Particle Swarm Optimization (PSO) algorithm to the field of objective identification, generalizes a particle to an objective identification window with a starting point size of the particle as a predefined size, and generalizes the fitness value to a probability score of characterizing an objective. The Particle Swarm Optimization algorithm can quickly converge the search to a region with a higher probability score in the searched image and can make the identification rate of objective identification no longer proportional to the image size but in connection with the number of particles in the optimization algorithm, so as to satisfy with the application scenarios having different identification rate requirements.

Figure 3:
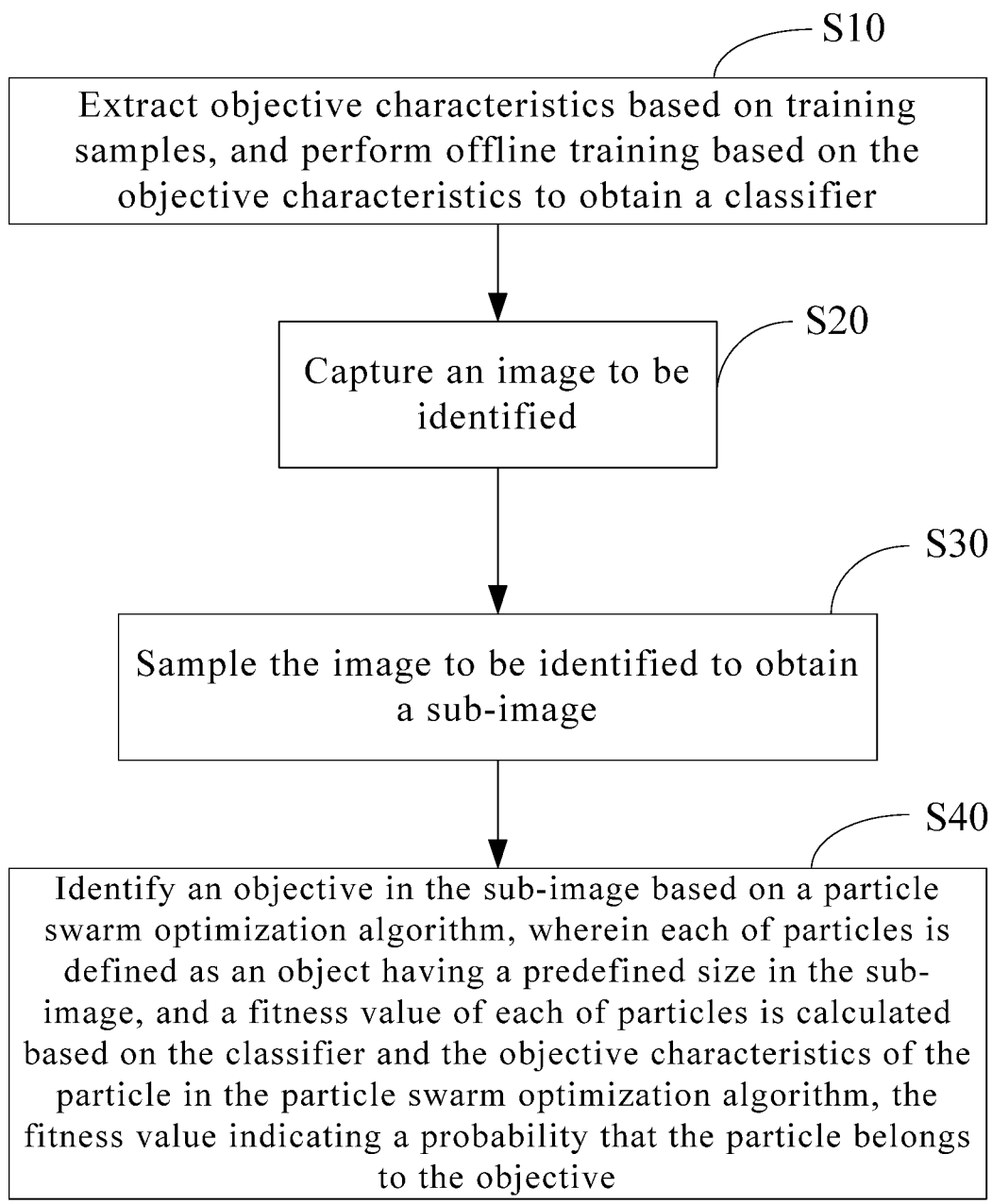
FIG. 3 is a flowchart of an objective identification method according to an embodiment of the present disclosure.

FIG. 3 is a flowchart of an objective identification method according to an embodiment of the present disclosure. Referring to FIG. 3, the objective identification method according to the embodiment of the present disclosure includes steps of:

S10, extracting objective characteristics based on training samples, and performing offline training based on the objective characteristics to obtain a classifier.

S20, capturing an image to be identified;

S30, sampling the image to be identified to obtain a sub-image; and

S40, identifying an objective in the sub-image based on a particle swarm optimization algorithm, wherein each of particles is defined as an object having a predefined size in the sub-image, and a fitness value of each of particles is calculated based on the classifier and the objective characteristics of the particle in the particle swarm optimization algorithm, the fitness value indicating a probability that the particle belongs to the objective.

Preferably, the objective characteristics include an integral channel feature.

Preferably, the classifier includes a boost classifier.

Figure 4:
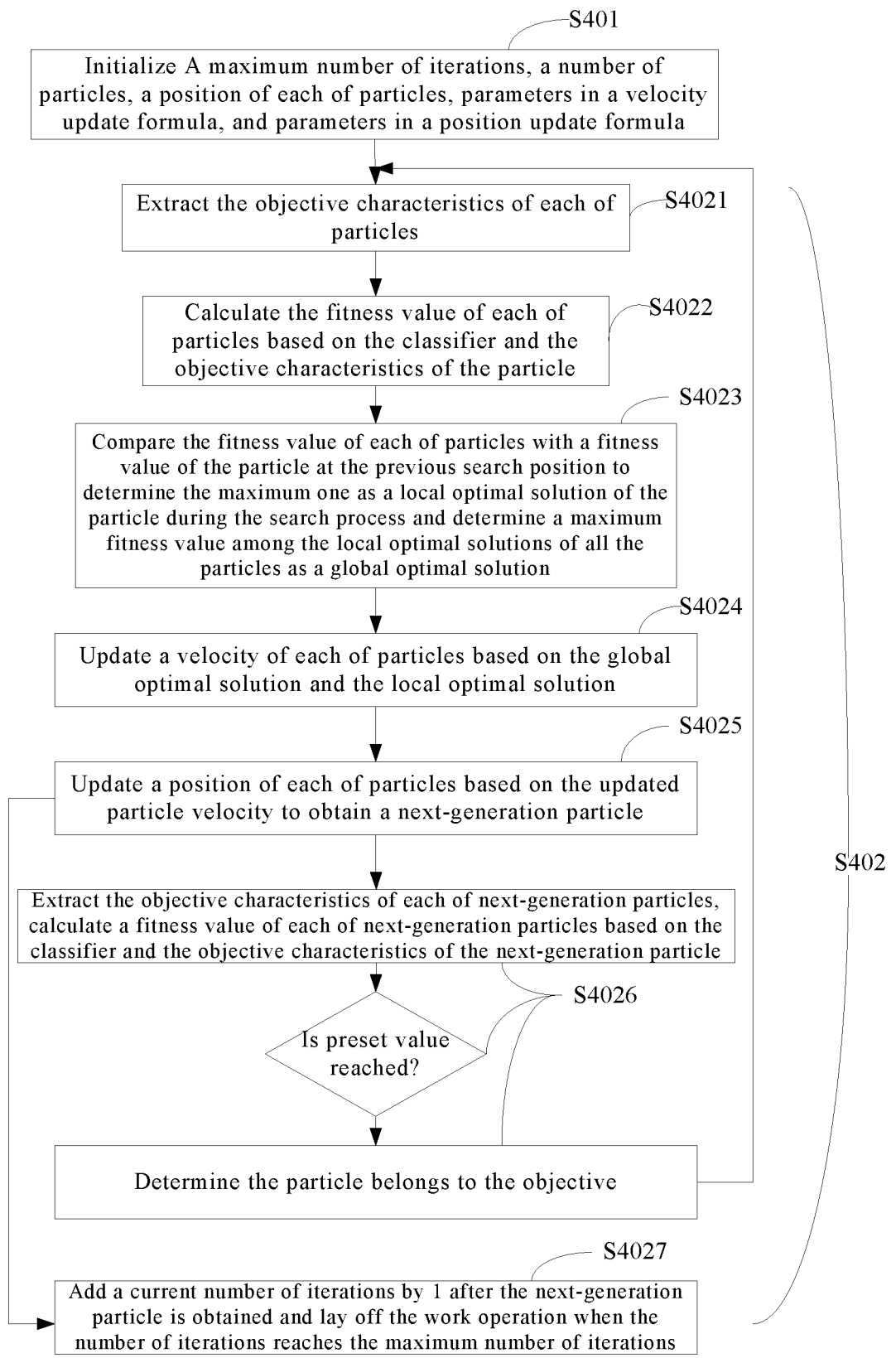
FIG. 4 is a flowchart of step S40 in FIG. 3.

Referring to FIG. 4, step S40 as described above includes steps of:

S401, an initialization step including: initializing a maximum number of iterations, a number of particles, a position of each of particles, parameters in a velocity update formula, and parameters in a position update formula; and S402, an operation step, including:

S4021, extracting the objective characteristics of each of particles;

S4022: calculating the fitness value of each of particles based on the classifier and the objective characteristics of the particle;

S4023, comparing the fitness value of each of particles with a fitness value of the particle at the previous search position to determine the maximum one as a local optimal solution of the particle during the search process and determine a maximum fitness value among the local optimal solutions of all the particles as a global optimal solution;

S4024, updating a velocity of each of particles based on the global optimal solution and the local optimal solution;

S4025, updating a position of each of particles based on the updated particle velocity to obtain a next-generation particle;

S4026: extracting the objective characteristics of each of next-generation particles, calculating a fitness value of each of next-generation particles based on the classifier and the objective characteristics of the next-generation particle, and judging whether the fitness value reaches a preset value, wherein if yes, it is determined that the particle belongs to the objective, or if not, the method returns to the operation step; and S4027: adding a current number of iterations by 1 after the next-generation particle is obtained and laying off the work operation when the number of iterations reaches the maximum number of iterations.

More specifically, step S30 includes: performing step-by-step scaling of the image to be identified according to a preset scaling factor to obtain a plurality of sub-images. In this case, when the number of iterations reaches the maximum number of iterations, the step S4022 further includes: identifying the objective based on the particle swarm optimization algorithm for a next-level sub-image.

Since the objective identification method according to the embodiment of the present disclosure corresponds to the objective identification device according to the above embodiment of the present disclosure and the objective identification device has been described in detail above, relevant contents of the objective identification method in this embodiment will not be described in detail herein. Reference can be made to the corresponding portion in the objective identification device.

In summary, the objective identification method according to the embodiment of the present disclosure applies the Particle Swarm Optimization (PSO) algorithm to the field of objective identification, generalizes a particle to an objective identification window with a starting point size of the particle as a predefined size, and generalizes the fitness value to a probability score of characterizing an objective. The Particle Swarm Optimization algorithm can quickly converge the search to a region with a higher probability score in the searched image and can make the identification rate of objective identification no longer proportional to the image size but in connection with the number of particles in the optimization algorithm, so as to satisfy with the application scenarios having different identification rate requirements.

An embodiment of the present disclosure also provides a driving assistance device including the objective identification device according to the above embodiment. The driving assistance device may include a camera, a processor, a memory, and the like. The processor may be integrated with a navigation system or a wide-vision system in a single structure such as a central control board, a rear-view mirror, or a driving data recorder. Here, the driving assistance device also includes an assist driver steering device. In addition, the driving assistance device also includes auxiliary devices in a driverless vehicle and the like.

In the driving assistance device according to the embodiment of the present disclosure, since the objective identification device according to the above-described embodiment of the present disclosure is used, objectives can be quickly identified. Therefore, an excellent assist driving effect can be obtained and an enhanced application can be provided.

An embodiment of the present disclosure also provides an electronic apparatus including a housing, a processor, a memory, a circuit board, and a power circuit, wherein the circuit board is mounted inside a space enclosed by the housing, and the processor and the memory are disposed on the circuit board; the power circuit is configured to supply power to various circuits or devices of the electronic apparatus; and the memory is configured to store executable program codes. The processor reads the executable program codes stored in the memory and runs a program corresponding to the executable program codes to execute steps of:

extracting objective characteristics based on training samples and obtaining a classifier based on offline training of the objective characteristics;

capturing an image to be identified;

sampling the image to be identified to obtain a sub-image; and identifying an objective based on a particle swarm optimization algorithm for the sub-image, wherein each of particles is defined as an object having a predefined size in the sub-image, and a fitness value of the particle is calculated based on the classifier and the objective characteristics of the particle in the particle swarm optimization algorithm, the fitness value indicating a probability that the particle belongs to the objective.

Here, the electronic apparatus may be integrated in a single structure such as a central control board, a rear-view mirror or a driving data recorder of the vehicle, or may be independent of the central control board, the rear-view mirror or the driving data recorder of the vehicle.

It can be understood that the above embodiments are merely exemplary embodiments provided for illustrating the principle of the present disclosure. However, the present disclosure is not limited thereto. For a person of ordinary skill in the art, various modifications and improvements may be made without departing from the spirit and essence of the present disclosure, and these modifications and improvements are also considered to be within the protection scope of the present disclosure.

What is claimed is:

1. An objective identification device, comprising a classifier training circuit and a calculation circuit, wherein
the classifier training circuit is configured to extract objective characteristics based on training samples and perform offline training based on the objective characteristics to obtain a classifier; and
the calculation circuit is configured to identify an objective in an image based on a particle swarm optimization algorithm, wherein each of particles in the particle swarm optimization algorithm is defined as an object having a predefined size in the image; and a fitness value of each of particles is calculated based on the classifier and the objective characteristics of the particle in the particle swarm optimization algorithm, the fitness value representing a probability that the particle belongs to the objective, wherein
the calculation circuit includes:
an initialization sub-circuit, configured to initialize a maximum number of iterations, a number of particles, a position of each of particles, parameters in a velocity update formula, and parameters in a position update formula;
an objective characteristic extraction sub-circuit, configured to extract the objective characteristics of each of particles;
a fitness value calculation sub-circuit, configured to calculate the fitness value of each of particles based on the classifier and the objective characteristics of the particle;
an optimal position determination sub-circuit, configured to compare the fitness value of each of particles with a fitness value of the particle at the previous search position to determine a maximum one of the fitness values as a local optimal solution of the particle during the search process and determine a maximum fitness value among the local optimal solutions of all the particles as a global optimal solution;
a particle velocity update sub-circuit, configured to update the velocity of each of particles based on the global optimal solution and the local optimal solution;
a particle position update sub-circuit, configured to update a position of each of particles based on the updated particle velocity to obtain a next-generation particle;
a result output sub-circuit, configured to judge whether the fitness value of each of next-generation particles calculated by the fitness value calculation sub-circuit reaches a preset value, wherein if yes, the objective identification device determines that the particle belongs to the objective, or if not, the objective identification device controls the optimal position determination sub-circuit to keep in operation; and
an iteration count sub-circuit, configured to add a current number of iterations by 1 after the next-generation particle is obtained, and send a lay-off instruction to the objective characteristic extraction sub-circuit when the number of iterations reaches the maximum number of iterations.

2. The objective identification device according to claim 1, further comprising an image capture circuit, configured to capture the image to be identified.

3. The objective identification device according to claim 2, further comprising a sampling circuit, the sampling circuit is configured to sample the image to be identified to obtain a sub-image.

4. The objective identification device according to claim 3, wherein
the calculation circuit is configured to identify the objective in the sub-image based on particle swarm optimization algorithm, wherein each of particles is defined as the object having the predefined size in the sub-image; and the fitness value of each of particles is calculated based on the classifier and the objective characteristics of the particle in the particle swarm optimization algorithm, the fitness value representing the probability that the particle belongs to the objective.

5. The objective identification device according to claim 1, wherein the objective characteristics comprise an integral channel feature.

6. The objective identification device according to claim 1, wherein the classifier comprises a boost classifier.

7. The objective identification device according to claim 1, wherein
the sampling circuit is configured to perform step-by-step scaling of the image to be identified in accordance with a preset scaling factor to obtain a multi-level sub-image; and
the calculation circuit is configured to identify the objective on a next level of sub-image based on the particle swarm optimization algorithm when the number of iterations reaches the maximum number of iterations.

8. A driving assistance device, comprising the objective identification device according to claim 1.

9. The driving assistance device according to claim 8, the objective identification device further comprising an image capture circuit and a sampling circuit, wherein
the image capture circuit is configured to capture the image to be identified; and
the sampling circuit is configured to sample the image to be identified to obtain a sub-image.

10. The driving assistance device according to claim 9, wherein
the calculation circuit is configured to identify the objective in the sub-image based on particle swarm optimization algorithm, wherein each of particles is defined as the object having the predefined size in the sub-image; and the fitness value of each of particles is calculated based on the classifier and the objective characteristics of the particle in the particle swarm optimization algorithm, the fitness value representing the probability that the particle belongs to the objective.

11. The driving assistance device according to claim 8, wherein the objective characteristics comprise an integral channel feature.

12. The driving assistance device according to claim 8, wherein
the sampling circuit is configured to perform step-by-step scaling of the image to be identified in accordance with a preset scaling factor to obtain a multi-level sub-image; and
the calculation circuit is configured to identify the objective on a next level of sub-image based on the particle swarm optimization algorithm when the number of iterations reaches the maximum number of iterations.

13. An objective identification method, comprising steps of:
- extracting objective characteristics based on training samples, and performing offline training based on of the objective characteristics to obtain a classifier; and
- identifying an objective in an image based on a particle swarm optimization algorithm, wherein each of particles in the particle swarm optimization algorithm is defined as an object having a predefined size in the image, and a fitness value of each of particles is calculated based on the classifier and the objective characteristics of the particle in the particle swarm optimization algorithm, the fitness value indicating a probability that the particle belongs to the objective, wherein the step of identifying the objective in the image based on the particle swarm optimization algorithm, includes:
- initializing a maximum number of iterations, a number of particles, a position of each of particles, parameters in a velocity update formula, and parameters in a position update formula;
- extracting the objective characteristics of each of particles;
- calculating the fitness value of each of particles based on the classifier and the objective characteristics of the particle;
- comparing the fitness value of each of particles with a fitness value of the particle at the previous search position to determine the maximum one as a local optimal solution of the particle during the search process and determine a maximum fitness value among the local optimal solutions of all the particles as a global optimal solution;
- updating a velocity of each of particles based on the global optimal solution and the local optimal solution;
- updating a position of each of particles based on the updated particle velocity to obtain a next-generation particle;
- extracting the objective characteristics of each of next-generation particles, calculating a fitness value of each of next-generation particles based on the classifier and the objective characteristics of the next-generation particle, and judging whether the fitness value reaches a preset value, wherein if yes, it is determined that the particle belongs to the objective, or if not, the method returns to the operation step; and
- adding a current number of iterations by 1 after the next-generation particle is obtained and laying off the work operation when the number of iterations reaches the maximum number of iterations.

14. The objective identification method according to claim 13, further comprising:
- capturing the image to be identified.

15. The objective identification method according to claim 14, further comprising:
- sampling the image to be identified to obtain a sub-image.

16. The objective identification method according to claim 13, wherein the step of sampling the image to be identified to obtain a sub-image comprises:
- performing step-by-step scaling of the image to be identified according to a preset scaling factor to obtain a plurality of sub-images; and
- in a condition that the number of iterations reaches the maximum number of iterations, the method further comprises: identifying the objective based on the particle swarm optimization algorithm for a next-level sub-image.

17. An electronic apparatus, comprising a housing, a processor, a memory, a circuit board, and a power circuit, wherein the circuit board is mounted inside a space enclosed by the housing, and the processor and the memory are disposed on the circuit board; the power circuit is configured to supply power to various circuits or devices of the electronic apparatus; and the memory is configured to store executable program codes, wherein the processor reads the executable program codes stored in the memory and runs a program corresponding to the executable program codes to execute steps of:
- extracting objective characteristics based on training samples, and performing offline training based on the objective characteristics to obtain a classifier;
- capturing an image to be identified;
- sampling the image to be identified to obtain a sub-image; and
- identifying an objective in the sub-image based on a particle swarm optimization algorithm, wherein each of particles is defined as an object having a predefined size in the sub-image, and a fitness value of each of particles is calculated based on the classifier and the objective characteristics of the particle in the particle swarm optimization algorithm, the fitness value indicating a probability that the particle belongs to the objective, wherein the step of identifying the objective in the sub-image based on the particle swarm optimization algorithm, includes:
- initializing a maximum number of iterations, a number of particles, a position of each of particles, parameters in a velocity update formula, and parameters in a position update formula;
- extracting the objective characteristics of each of particles;
- calculating the fitness value of each of particles based on the classifier and the objective characteristics of the particle;
- comparing the fitness value of each of particles with a fitness value of the particle at the previous search position to determine the maximum one as a local optimal solution of the particle during the search process and determine a maximum fitness value among the local optimal solutions of all the particles as a global optimal solution;
- updating a velocity of each of particles based on the global optimal solution and the local optimal solution;
- updating a position of each of particles based on the updated particle velocity to obtain a next-generation particle;
- extracting the objective characteristics of each of next-generation particles, calculating a fitness value of each of next-generation particles based on the classifier and the objective characteristics of the next-generation particle, and judging whether the fitness value reaches a preset value, wherein if yes, it is determined that the particle belongs to the objective, or if not, the method returns to the operation step; and
- adding a current number of iterations by 1 after the next-generation particle is obtained and laying off the work operation when the number of iterations reaches the maximum number of iterations.

* * * * *